(12) United States Patent
Panaitopol et al.

(10) Patent No.: US 9,020,521 B2
(45) Date of Patent: Apr. 28, 2015

(54) APPARATUS AND METHOD FOR SIGNAL DETECTION

(75) Inventors: Dorin Panaitopol, Berkshire (GB); Ismail Fourari, Berkshire (GB); Lanto Rakotoharison, Berkshire (GB); Pierre Marchand, Berkshire (GB)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 13/880,668

(22) PCT Filed: Oct. 20, 2011

(86) PCT No.: PCT/JP2011/074883
§ 371 (c)(1),
(2), (4) Date: Jun. 5, 2013

(87) PCT Pub. No.: WO2012/053665
PCT Pub. Date: Apr. 26, 2012

(65) Prior Publication Data
US 2013/0267180 A1    Oct. 10, 2013

(30) Foreign Application Priority Data
Oct. 22, 2010    (GB) .................................. 1017877.0

(51) Int. Cl.
| | | |
|---|---|---|
| *H04W 16/14* | (2009.01) | |
| *H04W 24/00* | (2009.01) | |
| *H04B 17/00* | (2006.01) | |
| *H04L 25/02* | (2006.01) | |
| *H04L 27/00* | (2006.01) | |

(Continued)

(52) U.S. Cl.
CPC ........... *H04W 24/00* (2013.01); *H04B 17/0055* (2013.01); *H04B 17/007* (2013.01); *H04L 25/0202* (2013.01); *H04L 27/0006* (2013.01); *H04W 8/005* (2013.01); *H04W 28/04* (2013.01)

(58) Field of Classification Search
CPC .............................. H04W 16/14; H04W 72/02
USPC ...................... 455/450, 454, 501, 63, 1, 67.13
See application file for complete search history.

(56) References Cited

U.S. PATENT DOCUMENTS 8,325,781 B2 * 12/2012 Haartsen ........................ 375/130
8,655,369 B2 *  2/2014 Chen ............................. 455/454

(Continued)

FOREIGN PATENT DOCUMENTS

JP    2010-35170 A    2/2010

OTHER PUBLICATIONS

Wei Lin et al, "A Design of Energy Detector in Cognitive Radio under Noise Uncertainty", Communication Systems, 2008. ICCS 2008. 11th IEEE Singapore International Conference on Nov. 21, 2008, pp. 213-217.

(Continued)

*Primary Examiner* — Sonny Trinh
(74) *Attorney, Agent, or Firm* — Sughrue Mion, PLLC

(57) ABSTRACT

A communications apparatus capable of detecting a signal transmitted by another apparatus in a first band of spectrum is described. The apparatus identifies at least one second band of spectrum, different from the first band of spectrum, in which no signal is detected and then determines a noise characteristic for the at least one second band of spectrum. The determined noise characteristic may then be used by an energy detector operating in the first band of spectrum to ensure reliable detection of signals transmitted by the other apparatus.

17 Claims, 3 Drawing Sheets

(51) Int. Cl.
*H04W 8/00* (2009.01)
*H04W 28/04* (2009.01)

(56) References Cited

U.S. PATENT DOCUMENTS

2008/0139213 A1* 6/2008 Coersmeier ............ 455/450
2010/0081387 A1* 4/2010 Shi et al. ................ 455/62
2011/0028179 A1* 2/2011 Sawai et al. ............ 455/522

OTHER PUBLICATIONS

Zhuan Ye et al., "Energy Detection Using Estimated Noise Variance for Spectrum Sensing in Cognitive Radio Networks", Wireless Communications and Networking Conference, 2008. WCNC 2008. IEEE, Apr. 3, 2008, pp. 711-716.

International Search Report of PCT/JP2011/074883 dated Dec. 6, 2011.

* cited by examiner

APPARATUS AND METHOD FOR SIGNAL DETECTION

CROSS REFERENCE TO RELATED APPLICATIONS

This is a National Stage of International Application No. PCT/JP2011/074883 filed Oct. 20, 2011, claiming priority based on British Patent Application No. 1017877.0 filed Oct. 22, 2010, the contents of all of which are incorporated herein by reference in their entirety.

TECHNICAL FIELD

The present invention relates to detection of a signal in a band of spectrum, particularly but not exclusively to detection of a signal using an energy detector. The invention has particular, but not exclusive, relevance to detection of a primary user of a band of spectrum by a secondary user in a cognitive radio network.

BACKGROUND ART

Traditionally, wireless networks are confined to certain limited parts of the radio spectrum allocated for that purpose. Allocation of the radio spectrum is controlled by nationally regulatory bodies which allocate the radio spectrum according to need, or to licensed users. For example, television broadcasts and mobile communications networks are restricted to specific allocated frequencies. However, it has been found that many frequencies may not be used all of the time, leading to inefficient use of portions of the radio spectrum. If such temporarily un-used portions of the spectrum could be re-used for another purpose, more efficient use could be made of the radio spectrum.

Cognitive radio has been proposed as a way of increasing the efficiency with which the radio spectrum is used. In a cognitive radio network, nodes may communicate using frequencies allocated for a different purpose or to a licensee, but which are not currently in use, for example on a broadcast frequency that is not currently in use. However, in order to ensure that the primary user of the frequency is not inconvenienced by this frequency re-use, secondary users (i.e. the cognitive radios) must detect any signal transmitted by the primary user and immediately cease use of the frequency in order to avoid causing any interference to the primary user.

SUMMARY OF INVENTION

Technical Problem

Thus, a mobile radio system may occupy a given band of spectrum, for example B0, as a secondary user, having previously determined that the owner of the band B0 is currently absent from the band. However, the secondary user must immediately stop using B0 if the primary user decides to use B0. This means that the secondary user must have some sensing capabilities to be able to detect the incoming primary user very quickly and with high reliability, so as to limit any interference caused to the incoming primary user.

In order to allow a secondary user to detect an incoming primary user, a number of different types of signal detectors have been developed. The most commonly used detector (and simplest) is an Energy Detector. Energy Detectors operate by computing the energy of a received signal in the band B0 and comparing the calculated value against a threshold energy value. If the received signal contains only noise, the calculated value will be lower than a signal containing noise and a signal transmitted by the primary user. This provides a fast method of detecting a signal within the band of spectrum, however in order to set the threshold it is necessary to provide a good estimate of the noise variance of the band B0. If an accurate estimate of the noise variance is not available, the energy detector method becomes unreliable, and may lead to false positive detections which will decrease the transmission capacity of the secondary user or, worse, a failure to detect an incoming primary user leading to interference.

Known methods to reliably estimate the noise variance often take a relatively long time. In particular, any methods must take into account the fact that the presence/absence of the primary signal in addition to noise is by definition uncertain, which impacts on the reliability of the noise variance estimate.

Thus, according to present methods it is necessary to make a trade off between fast detection, accepting that the energy detector performance may be affected by a poor estimate of noise variance, or very reliable detection requiring a more complicated and slower signal detector.

To date, providing fast detection of an incoming primary user and also a very high probability of detection at the same time remains a challenge.

Embodiments of the invention aim to at least partially address some of the problems with the prior art described above.

Solution to Problem

According to a first aspect of the invention, there is provided an apparatus for detecting presence of a signal in a first band of spectrum, the apparatus comprising: means for identifying at least one second band of spectrum, different from the first band, in which no signal is detected, determining a noise characteristic for the second bands, and detecting the presence of the signal in the first band based on the determined noise characteristic.

The apparatus may further comprise means for transmitting signals in the first band when no signals are detected in the first band.

The noise characteristic may be an estimated a noise variance for the identified bands.

The means for identifying a second band of spectrum comprise means for calculating a kurtosis parameter for received samples; a cyclostationary detector; or means for performing an expectation maximization algorithm.

The means for determining a noise characteristic for the at least one second band comprise means for averaging a noise spectral density over the at least one second band.

The means for identifying and/or the means for determining may be implemented as a background process, or as a low priority process, while the means for detecting may be implemented as a high priority process. The means for identifying and the means for determining may be operable at a first rate and the means for detecting operable at a second rate, wherein the first rate is less than the second rate.

According to a further aspect of the invention, there is provided a method of detecting presence of a signal in a first band of spectrum, comprising: identifying at least one second band of spectrum, different from the first band, in which no signal is detected; determining a noise characteristic for the second bands; and detecting the presence of the signal in the first band based on the determined noise characteristic.

According to another aspect of the invention, there is provided a computer implementable product comprising computer implementable instructions for causing one or more computer devices to become configured as any of the above apparatus.

The invention provides, for all methods disclosed, corresponding computer programs or computer program products for execution on corresponding equipment, the equipment itself (user equipment, nodes or components thereof) and methods of updating the equipment.

An exemplary embodiment of the invention will now be described, by way of example, with reference to the accompanying drawings.

Advantageous Effects of Invention

The invention provides fast detection of an incoming primary user and also a very high probability of detection at the same time.

DESCRIPTION OF EMBODIMENTS

Overview

Figure 1:
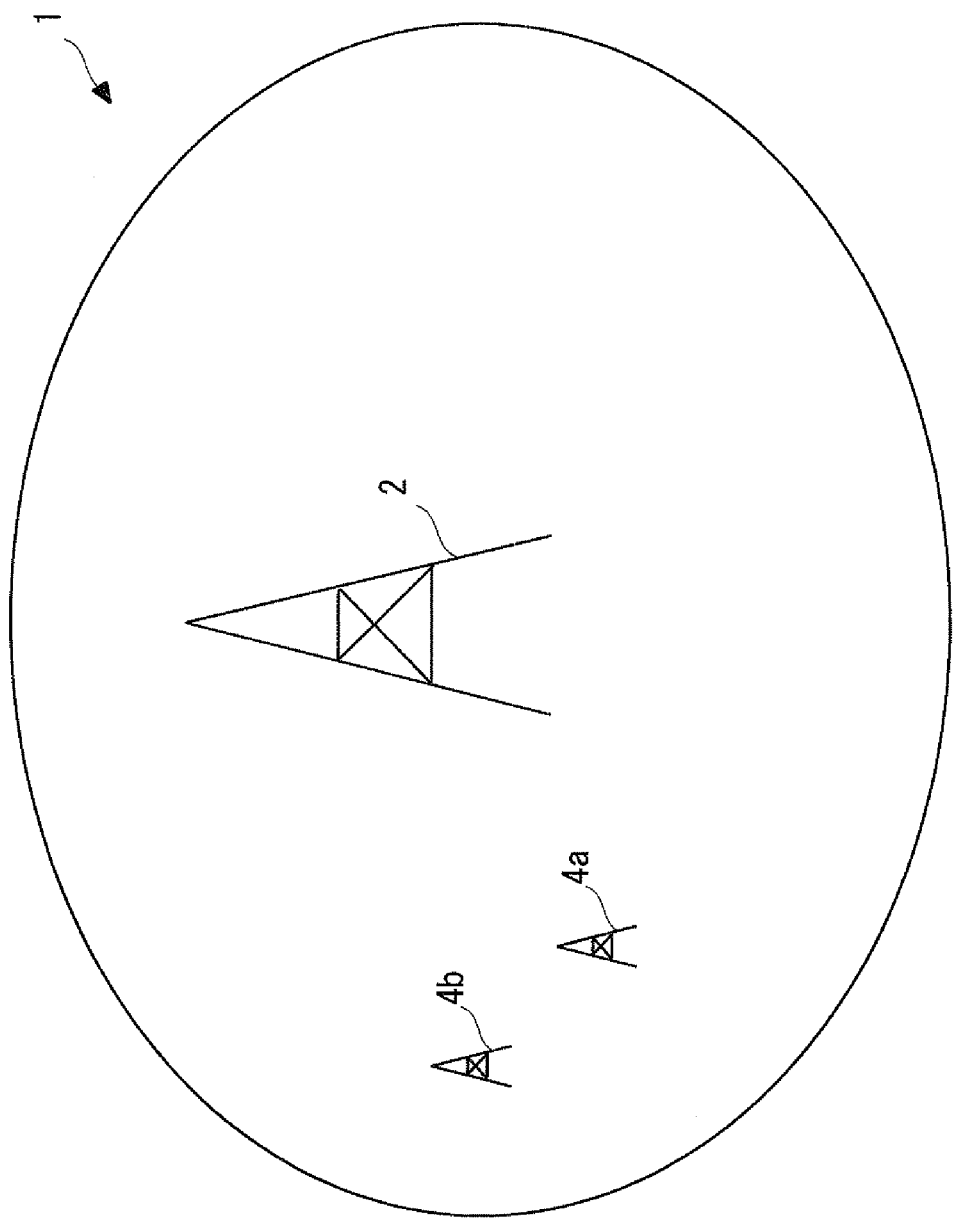
FIG. 1 schematically illustrates a mobile telecommunication system of a type to which the invention is applicable.

FIG. 1 schematically illustrates an area 1 in which a primary user 2 broadcasts on a first band of radio spectrum B0. A mobile radio system operates within the area covered by primary user 2. The mobile radio system includes cognitive radio nodes 4a and 4b. Nodes 4a and 4b monitor received signals in a plurality of radio bands including the first band B0, and when it is determined that the primary user 2 is not broadcasting in the band B0, the nodes 4a and 4b may communicate using that band.

At some time, primary user 2 may begin to operate in the band B0 again. No prior indication of primary user's transmissions is available to nodes 4a and 4b. In order to avoid interfering with the primary user, nodes 4a and 4b must immediately cease all use of the band B0. Thus, the nodes include signal detection capability to allow them to determine when the primary user has begun transmitting a signal in the band B0.

In order to provide a fast detection of an incoming primary user of the band B0, cognitive radio nodes according to the present invention use an energy detection method. To implement energy detection, the energy of signals received in the band B0 is determined and the determined value compared against a threshold energy value. If the received signal consists of only noise, the determined energy value will be lower than a received signal including noise and a signal from another user of the band B0, such as the primary user. By setting the threshold energy value to be just above the expected noise energy a decision can be made quickly be comparing the calculated value with the threshold.

However, to provide accurate detection of a signal, the correct threshold energy value must be determined. If the threshold value is too low, false positives detections may be generated due to received noise, too high and a node may fail to detect a primary user causing interference. In order to determine the correct threshold value, it is necessary to provide accurate noise variance estimates for the noise received on band B0.

The noise variance can be assumed to vary relatively slowly compared with the speed with which an incoming primary user must be detected to avoid interference. Furthermore, a noise variance in a band of radio spectrum different to the band B0 can provide a good estimate of the noise variance in the band of interest B0. In particular, a band neighbouring the band B0 in the radio spectrum can be expected to have a very similar noise variance.

Thus, the noise variance for band B0 may be estimated based on signal measurements in at least one band Bi, different from band B0, and need only be updated relatively infrequently. As the noise variance estimate need only be updated at a relatively slow rate, compared to the speed required for detection of a primary user signal, it is possible to use slower algorithms which are able to detect the presence of a signal very reliably, and without requiring the noise variance to be known, to identify a band Bi in which no signal is present. Once band Bi has been identified, a noise variance estimation can be performed for band Bi to provide an accurate noise variance estimate for use in the energy detection method to detect other user signals on band B0.

Cognitive Radio Node

Figure 2:
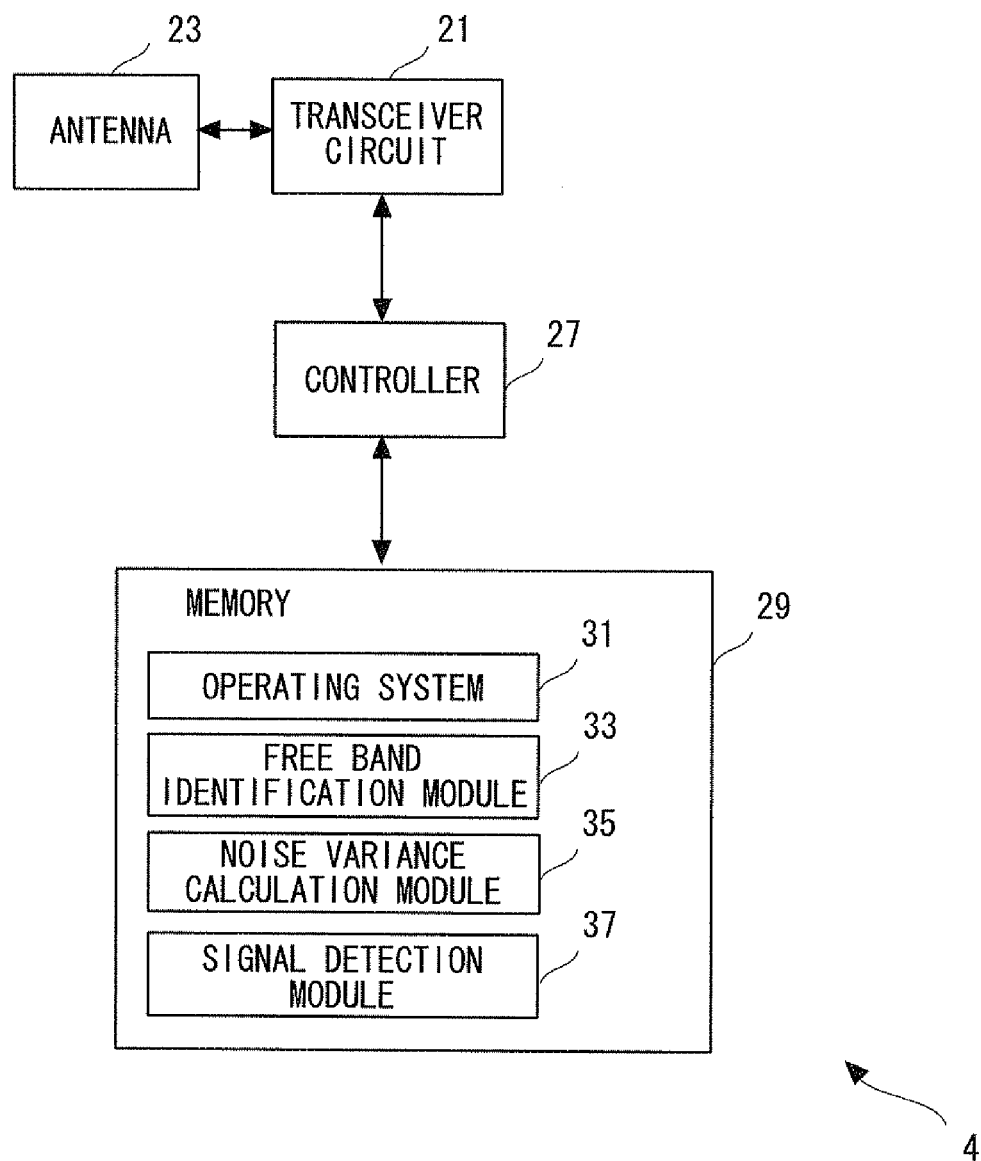
FIG. 2 shows a block diagram of a cognitive radio node in accordance with the invention.

FIG. 2 is a block diagram illustrating the main components of a cognitive radio node 4, such as nodes 4a and 4b shown in FIG. 1. As shown, each node includes transceiver circuitry 21 which is operable to transmit signals to and to receive signals from other nodes via one or more antennas 23 using a first band of radio spectrum B0. A controller 27 controls the operation of the transceiver circuitry 21 in accordance with software stored in memory 29. The software includes, among other things, an operating system 31, a free band identification module 33, a noise variance estimation module 35, and a signal detection module 37. The operating system 31 is operable to control operation of the node. The free band identification module 33 is operable to identify at least one band of radio spectrum, other than band B0, that does not currently contain any received signal, i.e. on which only noise is received at the node. The noise variance estimation module 35 estimates the noise variance for signals received on at least one band identified by the free band identification module 33, and supplies the estimated noise variance to the signal detection module 37. The signal detection module 37 is operable to monitor the band B0 currently in use for communication with other nodes in the cognitive radio system and to detect any primary user signal on the band B0 based on the estimated noise variance supplied by the noise variance calculation module.

In the above description, the node 4 is described, for ease of understanding, as having a number of discrete modules (such as the free band identification module 33, the noise variance estimation module 35, the signal detection module 37, etc). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

The free band identification module 33 may use one of a number of methods to reliably identify a band of spectrum in the neighbourhood of B0 in which there is only noise without requiring prior knowledge of the noise variance. Typical example methods that could be used by free band identification module 33 include:

Expectation Maximization (EM): To implement the expectation maximization algorithm, the free band identification module 33 determines if the incoming signal in bands Bi, different from band B0, consist of a mixture of two (or more) probability density functions (PDF), each PDF having its own variance and mixing probability. If it is determined that the incoming signals in a particular band consist of two probability density functions, then the incoming signal in that band must consist of more than just noise, i.e. a signal is present. Implementing the free band identification module 33 using the EM algorithm leads to a module that it is easy to implement, completely blind (i.e. no assumption needs to be made about the properties of the incoming signal), and which can also determine the band occupancy and can therefore be performed in narrowband frequencies. The EM algorithm operates on samples of the Fast Fourier Transform (FFT) of the incoming signal.

Cyclostationary detector: The free band identification module 33 may be implemented as a Cyclostationary detector. In this embodiment, the free band identification module 33 checks if the incoming signals in bands Bi, different to band B0, exhibit certain cyclic frequencies. As noise is assumed to be stationary, detection of cyclic frequencies in a band Bi means that a signal has been detected.

Kurtosis computation: The free band identification module 33 may exploit the fact that the kurtosis (a 4th order statistic of a probability distribution) is zero for a Gaussian signal. Thus, if the kurtosis for incoming signals on band Bi is not equal to zero, it is determined that a signal exists in the band Bi in addition to noise. Like the EM algorithm, the kurtosis computation is made on samples of the FFT of the incoming signal. In order to use the Kurtosis computation, it is assumed that the noise in band Bi is Gaussian.

Depending on the method used by the free band identification module 33, different input parameters may be required. For example, for the EM algorithm, an input parameter may specify the number of PDFs to be expected within a signal. Typically, two PDFs may be assumed. Implementing the Cyclostationary Detector requires that a target false alarm probability (Pfa) is specified. For some implementations of cyclostationary detectors it may also be necessary to define an expected cyclic frequency of a signal that may be expected in the band Bi (i.e. in the case of semi-blind implementations).

Once a free band has been identified, it is provided to the noise variance estimation module 35. The noise variance may be estimated using any known method, for example the noise variance estimation module 35 may perform classical averaging of the observed noise spectral density over the whole set of identified bands Bi.

The free band identification module 33 and noise variance estimation module 35 are triggered with a certain frequency to provide periodic updates to the noise variance estimate. As discussed above, the noise variance is assumed to vary relatively slowly, and therefore the noise variance estimate need only be updated relatively infrequently.

The signal detection module 37 uses an energy detection method to monitor the band B0 for signals from another user, such as the primary user 2. The signal detection module 37 receives the noise variance estimate from the noise variance estimation module 35 and uses this value to determine a noise energy threshold for the energy comparison. In this way, an accurate estimate of the noise variance can be provided to the energy detector module to allow the threshold to be accurately set, resulting in reliable signal detection by the signal detection module 37.

In order to provide rapid detection of an incoming primary user 2, signal detection module 37 is triggered to make a determination of the presence/absence of a signal on band B0 with a relatively high frequency. This allows an incoming primary user 2 to be detected quickly and any period of interference to be minimized. Typically, the rate at which the signal detection module 37 is triggered is much greater than the rate at which an updated noise variance estimate is determined by the free band identification module 33 and noise variance estimation module 35.

A cognitive radio node 4 implemented as described above is able to detect all kinds of radio signals from a primary user 2, or another secondary user, in a specific frequency band. Examples of different kinds of signals that may be detected include: Digital Video Broadcast Terrestrial (DVB-T) signals, Program Making and Special Events (PMSE) signals including FM or QPSK modulation, etc.

Figure 3:
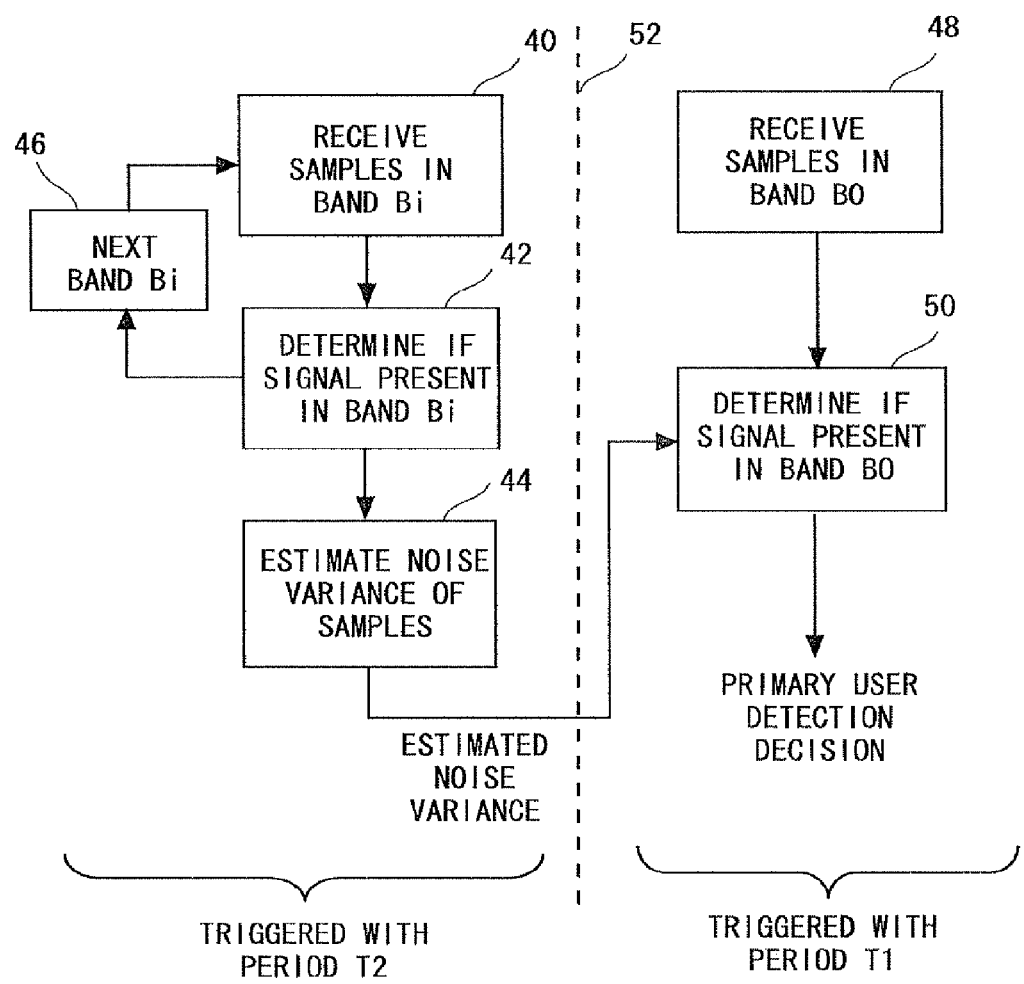
FIG. 3 illustrates a method of detecting a signal on a band of radio spectrum in accordance with the invention.

FIG. 3 illustrates the method performed by the node 4 for detecting an incoming primary user 2 according to the invention. According to the illustrated method, band Bi, different to band B0, is sampled at block 40, and the samples are passed to the free band identification module 33 to determine if a signal is present in band Bi in block 42. If a signal is detected, a new band Bi is selected in block 46, and new samples are taken at block 40. If no signals are present, an estimation of the noise variance in band Bi is determined in block 44. This noise variance estimate is passed to the signal detector module 37, which also receives samples of the band B0, and determines if a signal is present in band B0 in block 50. A primary user detection decision is then output from block 50.

The method illustrated in FIG. 3 may be implemented as at least two processes separated by the dashed line 52. Such processes may be arranged to execute in parallel, and may be executed with different priorities. For example, a process performing the functionality of method blocks 48 and 50 may be given a relatively high priority in order to ensure that any incoming primary user is detected quickly, while a process performing the functionality of method blocks 40 to 46 may be given a relatively low priority, or could be executed as a background process, to allow the noise variance estimate to be updated when spare processing and/or radio resources are available on the node 4.

According to some embodiments, the free band identification module 33 may scan a number of bands of spectrum and identify one or more bands in which no signals can be detected. The noise variance estimation module 35 may then average the noise variance from several Bi bands that have been identified by the free band identification module 33.

As shown in FIG. 3, blocks 40 to 46 of the method in which a noise variance estimate is determined are triggered with a period of T2, and blocks 48 and 50 relating to detection of a signal in the band of interest B0 are triggered with a different period T1. In general T1 represents a much shorter duration than represented by T2.

Embodiments of the invention provide a reliable and fast detection of an incoming primary user in a first band of spectrum by using a energy detector on signals received within the first band, while identifying a separate band where the noise variance can be estimated for use by the energy detector. The estimation of the noise variance may be performed at a rate that is much slower than the rate at which the energy detector operates, and therefore the estimation may use slower algorithms to identify a free band for the noise variance estimation without impacting on the speed with which a signal can be identified in the first band. The described embodiment may be able to operate completely blind (i.e. with no knowledge of the signal(s) that may be expected within the band of interest).

Embodiments of the invention may use the output of the free band identification module 33 to populate a database of free/occupied bands which in prior art cognitive radios may require specific means to be included for this purpose.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

According to some embodiments, the free band identification module 33 and/or the noise variance estimation module 35 may be executed as a background process. Such a background process may be executed with a relatively low priority, allowing an updated noise variance estimate to be generated when spare processing or radio resources are available at the node. Alternatively or additionally, the free band identification module 33 and/or the noise variance estimation module 35 could be arranged to be triggered on demand, such as when it is determined that an updated noise variance estimate is required for use in the signal detection module 37.

In the above embodiment, a cognitive radio node was described. As those skilled in the art will appreciate, such nodes may comprise any kind of communications node or device, including access points and user devices such as, for example, mobile telephones, personal digital assistants, laptop computers, web browsers, etc.

In the above embodiments, a number of software modules were described. As those skilled will appreciate, the software modules may be provided in compiled or un-compiled form and may be supplied to the cognitive node as a signal over a computer network, or on a recording medium. Further, the functionality performed by part or all of this software may be performed using one or more dedicated hardware circuits. However, the use of software modules is preferred as it facilitates the updating of the node 4 in order to update its functionality. Similarly, although the above embodiments employed transceiver circuitry, at least some of the functionality of the transceiver circuitry can be performed by software.

This software can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Various other modifications will be apparent to those skilled in the art and will not be described in further detail here.

As mentioned above, although the present invention is explained with reference to the illustrative embodiment, the present invention is not limited by the above. Various modifications understood by a person skilled in the art can be made within the scope of the invention.

The present application claims priority rights of and is based on United Kingdom Patent Application No. 1017877.0 filed on 22 Oct. 2010 in the United Kingdom Intellectual Property Office, the entire contents of which are hereby incorporated by reference.

INDUSTRIAL APPLICABILITY

The present invention relates to detection of a signal in a band of spectrum, particularly but not exclusively to detection of a signal using an energy detector.

REFERENCE SIGNS LIST

1 BROADCAST AREA
2 PRIMARY USER
4A COGNITIVE RADIO NODE
4B COGNITIVE RADIO NODE
4 COGNITIVE RADIO NODE
21 TRANSCEIVER CIRCUIT
23 ANTENNA
27 CONTROLLER
29 MEMORY
31 OPERATING SYSTEM
33 FREE BAND IDENTIFICATION MODULE
35 NOISE VARIANCE CALCULATION MODULE
37 SIGNAL DETECTION MODULE

The invention claimed is:

1. An apparatus for detecting presence of a signal in a first band of spectrum, the apparatus comprising:
   a unit for identifying at least one second band of spectrum, different from the first band, in which no signal is detected;
   determining a noise characteristic for the second bands; and
   detecting the presence of the signal in the first band based on the determined noise characteristic.

2. The apparatus of claim 1 further comprising:
   a unit for transmitting signals in the first band when no signals are detected in the first band.

3. The apparatus of claim 1, wherein the noise characteristic comprises a noise variance.

4. The apparatus of claim 1, wherein the unit for identifying a second band of spectrum comprise a unit for calculating a kurtosis parameter for received samples.

5. The apparatus of claim 1, wherein the unit for identifying a second band of spectrum comprise a cyclostationary detector.

6. The apparatus of claim 1, wherein the unit for identifying a second band of spectrum comprise a unit for performing an expectation maximization algorithm.

7. The apparatus of claim 1, wherein the unit for determining a noise characteristic for the at least one second band comprise a unit for averaging a noise spectral density over the at least one second band.

8. The apparatus of claim 1, wherein the unit for identifying and the means for determining are operable at a first rate, the unit for detecting are operable at a second rate, and wherein the first rate is less than the second rate.

9. The apparatus as claimed in claim 1, wherein the unit for identifying comprises a background process.

10. A non-transitory computer-readable information recording medium storing a program for causing one or more programmable computer devices to become configured as the communications apparatus of claim 1.

11. A method of detecting presence of a signal in a first band of spectrum, comprising:
   identifying at least one second band of spectrum, different from the first band, in which no signal is detected;
   determining a noise characteristic for the second bands; and
   detecting the presence of the signal in the first band based on the determined noise characteristic.

12. The method of claim 11, wherein the noise characteristic comprises a noise variance.

13. The method of claim 11, wherein identifying a second band of spectrum comprises calculating a kurtosis parameter for received samples.

14. The method of claim 11, wherein identifying a second band of spectrum comprises performing an expectation maximisation algorithm.

15. The method of claim 11, wherein identifying a second band of spectrum comprises using a cyclostationary detector.

16. The method of claim 11, wherein determining a noise characteristic comprises averaging a noise spectral density over the at least one second band.

17. The method of claim 11, further comprising transmitting signals in the first band when no signals are detected in the first band.

* * * * *